(12) United States Patent
Hanefeld et al.

(10) Patent No.: US 6,394,499 B1
(45) Date of Patent: May 28, 2002

(54) SELF-ADHESIVE STAMP CONSTRUCTION

(75) Inventors: David P. Hanefeld, Northridge, CA (US); Max A. DeHerrera; James A. Helzer, both of Cheyenne, WY (US); Alan Green, Greenwood, SC (US); Vance P. Mattison, Clinton, SC (US); Julia J. Souther, Mauldin, SC (US)

(73) Assignees: Unicover Corporation, Cheyenne, WY (US); Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/080,602

(22) Filed: May 18, 1998

(Under 37 CFR 1.47)

Related U.S. Application Data

(60) Provisional application No. 60/047,992, filed on May 28, 1997.

(51) Int. Cl.[7] ............................................... B42D 15/00
(52) U.S. Cl. .......................................... 283/71; 83/861
(58) Field of Search ................................ 156/252, 267, 156/277, 291, 257; 40/638; 283/71, 81, 101, 105, 67, 70; 83/861, 863, 864, 884, 609

(56) References Cited

U.S. PATENT DOCUMENTS

| | | | |
|---|---|---|---|
| 4,472,461 A | 9/1984 | Johnson | 427/208.6 |
| 4,793,070 A | 12/1988 | Hohner | 33/541 |
| 5,011,559 A | 4/1991 | Felix | 156/257 |
| 5,118,030 A | 6/1992 | McNamara et al. | 229/69 |
| 5,164,444 A | 11/1992 | Bernard | 524/833 |
| 5,183,459 A | 2/1993 | Bernard | 602/52 |
| 5,264,532 A | 11/1993 | Bernard | 526/261 |
| 5,294,278 A | 3/1994 | Matsui et al. | 156/248 |
| 5,296,279 A | 3/1994 | Birnbaum et al. | 428/42 |
| 5,385,965 A | 1/1995 | Bernard et al. | 524/272 |
| 5,503,436 A | 4/1996 | Alpaugh et al. | 283/71 |
| 5,902,439 A | * 5/1999 | Pike et al. | 283/71 X |
| 5,983,768 A | * 11/1999 | Abt et al. | 83/861 |
| 6,132,829 A | * 10/2000 | Kennerly et al. | 283/81 X |
| 6,136,209 A | * 10/2000 | Kang | 53/861 |

FOREIGN PATENT DOCUMENTS

WO    WO 89/01831    3/1989

* cited by examiner

Primary Examiner—Willmon Fridie, Jr.
(74) Attorney, Agent, or Firm—Hamilton, Brook, Smith & Reynolds, P.C.

(57) ABSTRACT

A stamp product is described which is self-adhesive and adheres to a release liner. The product is imprinted with stamp graphics and perforated about the periphery of the graphics and through the liner to define each stamp. The liner is cut opposite each stamp making each stamp accessible by tearing both liner and stamp at the perforations or by removal of the liner at each stamp and then tearing the stamp at the perforations.

12 Claims, 3 Drawing Sheets

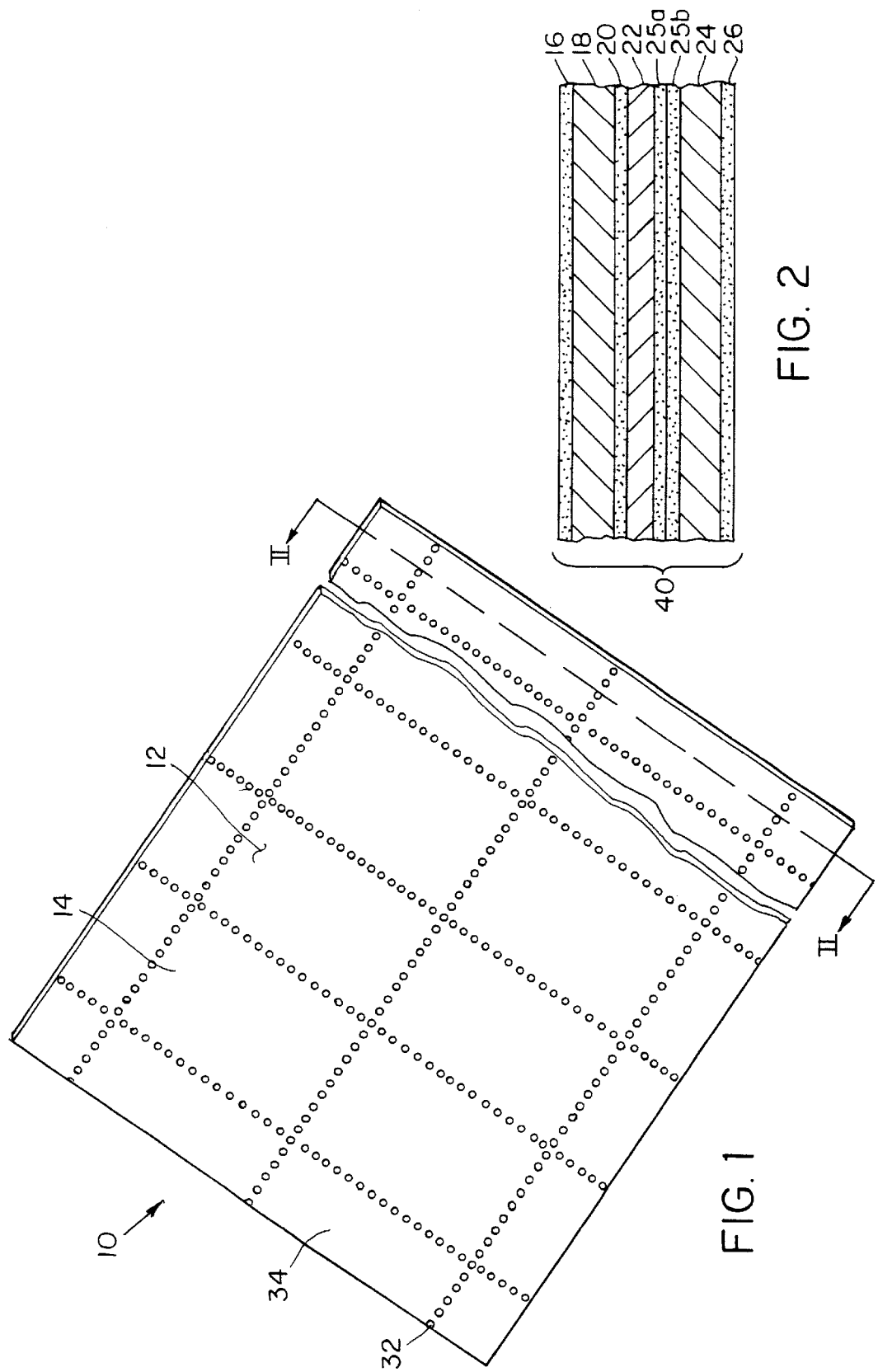

SELF-ADHESIVE STAMP CONSTRUCTION

RELATED APPLICATION

This application claims the benefit of U.S. Provisional Application Ser. No. 60/047,992, filed May 28, 1997, the entire teachings of which are incorporated herein by reference.

BACKGROUND OF THE INVENTION

Traditionally, postage stamps have been manufactured with a water activated adhesive and perforated holes. More recently, the postal services of many countries have converted, at least partially, to a self-adhesive or Pressure Sensitive Adhesive (PSA) construction which does not require any medium for activation and is formed from a laminate in which the self-adhesive postage stamps are releasably adhered to a release liner.

Traditionally self-adhesive stamps utilize die cutting technology proven during the production of billions of PSA unperforated postage stamps. Since 1990, virtually all known commercially-available self-adhesive stamps are die cut around the periphery to provide shape and enhance removal of individual stamps from the release liner. The largest user of self-adhesive stamps worldwide is the United States Postal Service. Originally, their PSA stamps were die cut in straight lines. As such, they were not always recognized by collectors as "stamps" since an important feature for collectors "stamps" is the full hole perforation and the ability of a user to separate individual stamps from each other with the liner intact. Therefore, more recently, the die cut technology was modified to include a sinusoidal pattern so as to create simulated perforations; and even more recently, stamps have been issued with only the liner microperforated to make severing one stamp from another easier.

These developments in self-adhesive die cut stamps have been designed to create self-adhesive stamps which are well accepted by both the public, the collector and even the postal service itself. The public favors self-adhesive stamps, due to its convenience in use, and collectors find them attractive to collect. However, until self-adhesives acquired simulated perforations, self-adhesive stamps were sometimes rejected by mail carriers as not being stamps (because they didn't look like stamps).

SUMMARY OF THE INVENTION

Accordingly, a need exists for a self-adhesive stamp product that can meet the user's need for convenience and which still has the traditional stamp-like appearance before and after use in mail.

In accordance with the present invention, a postage stamp product is provided comprising a laminate of a sheet of stamp paper containing stamp graphics on one side and a self-adhesive layer on the other side, and wherein said sheet is releasably adhered to a release liner.

The self-adhesive layer is preferably formed of a pressure sensitive adhesive which is adapted to provide clean perforations using male/female punch tooling. The release level of the adhesive precludes separation of the stamp paper during processing while providing convenient stamp removal from the release liner immediately prior to consumer use.

The laminate is perforated with a series of holes to form an array of stamps, including liner, connected to one another by unperforated portions. Preferably, the laminate is die cut through the release liner, around each stamp, to provide easy removal of the liner from each stamp.

Furthermore, in accordance with the invention, a method and apparatus for manufacturing the aforesaid stamp product is provided as follows.

One or more sheets of self-adhesive unperforated stamp stock laminate are disposed between a perforator comprising an array of upper pins and appropriately disposed lower hollow cutting members. The pins are reciprocally translated through the stock and into a longitudinal bore in the cutting member to perforate the stamp laminate. The length of the pins in relation to the thickness of the laminate and the depth of the longitudinal base is sufficient to perforate the laminate cleanly without carrying the perforation core waste back onto the perforator or laminate.

BRIEF DESCRIPTION OF THE DRAWINGS

FIG. 1 is a partial perspective top view of the preferred stamp sheet construction of the invention.

FIG. 2 is a cross-sectional exaggerated view along the lines II—II.

Figure 3:
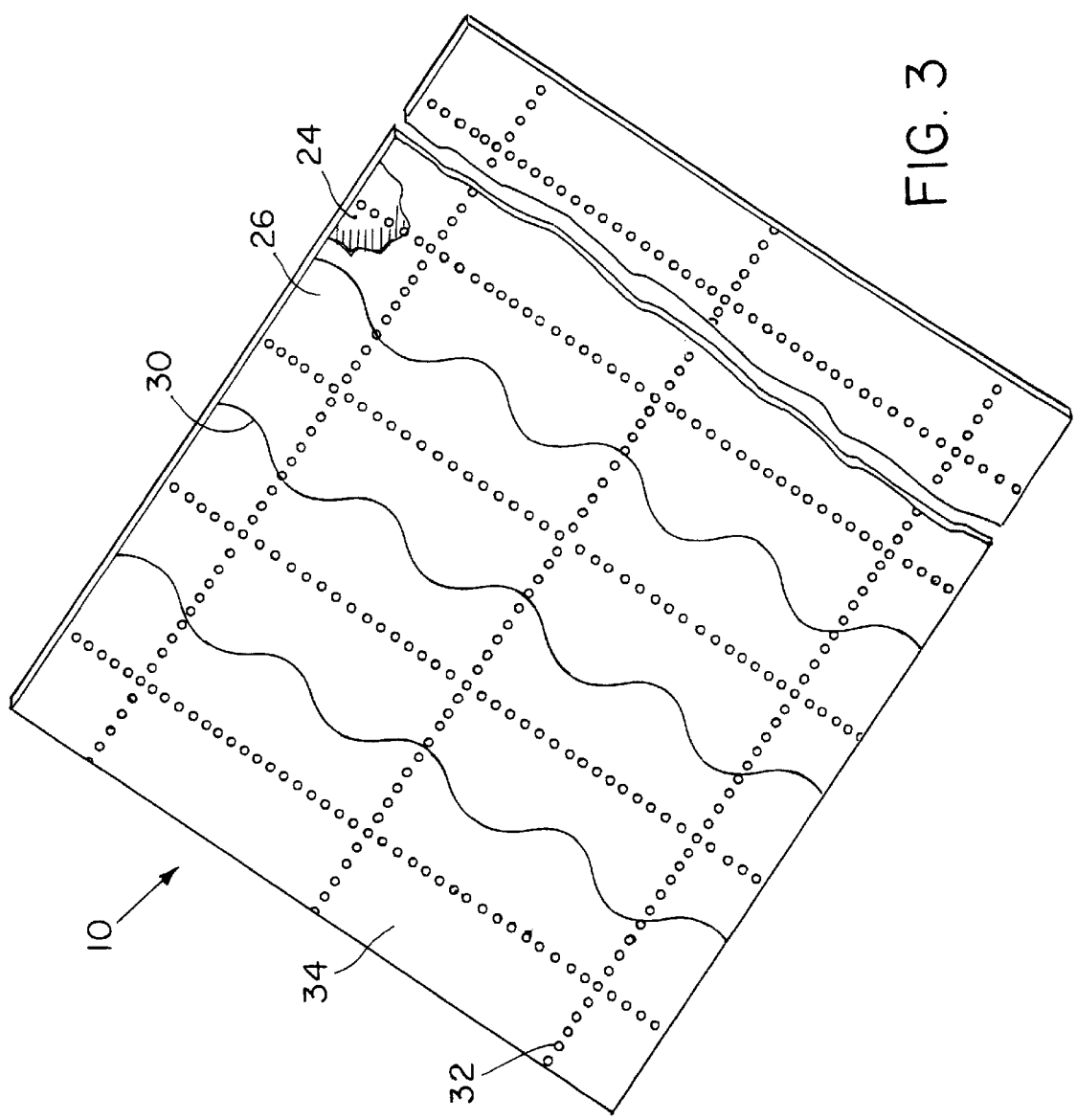
FIG. 3 is a partial perspective bottom view of the preferred stamp sheet construction of FIG. 1.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS OF THE INVENTION

With reference to FIGS. 1–3, a preferred stamp sheet product 10 consists of an N by M array 12 of stamps 14 (preferably in this case N=2×M=10) with optional contiguous borders 34 provided about the periphery thereof. A number of such arrays (e.g., six) may be formed as a single laminate and then die cut into separate products 10. For purposes of simplification, only one N×M array is shown here. The borders 34 can be used to print instructional information for the user, such as the fact that the stamps are "self-adhesive." On the opposite side of the product 10, as shown in FIG. 3, a release liner 24 protected by an optional printability undercoating 26 is provided with a die-cut sinusoidal pattern 30 provided thereon running through the thickness of the liner 24 and coating 26. The pattern 30 runs opposite each stamp 14.

As can be seen in the sectional view of FIG. 2, the unperforated unprinted PSA stamp laminate 40 is comprised of several layers or coatings, some of which may be optional, at the option of the end user, and some of which are mandated by the postal authorities. The principal steps in forming the laminate are as follows:

1) A printability coating 16, preferably consisting of calcium carbonate, clay and SBr as a binder is applied to a face paper sheet 18 preferably having a ream size of 25"×38"×500 sheets and a weight of 55–70 pounds per ream.

2) The undersurface of the face sheet 18 is preferably provided with a coating 20 of a water soluble primer which allows thorough soaking for a period of no more than 30 minutes to separate the stamp face from the adhesive for stamp collector purposes.

3) The next layer in the construction is an ooze resistant pressure sensitive adhesive layer 22, which is preferably applied as an acrylic emulsion polymer, but which may also be hot melt coated or applied from a solvent. U.S. Pat. Nos. 5,164,444, 5,183,459, 5,264,532 and 5,385,965 (incorporated herein by reference in their entirety) disclose suitable adhesives for use herein.

4) Adhesive layer 22 is formed of a first material coating 25a of a Controlled Release Agent (CRA), such as, commercially available GE SS-4335 which is added to a silicone "holdout" material 25b. Material 25b reduces the silicone penetration into the paper fibers and allows a continuous even spread out of the silicon onto the surface.

5) Next, release liner 24 is applied to the coatings 25a and 25b and retained thereby. Preferably, liner 24 is formed of about 51 pound per ream paper of the type sold by Avery Dennison under the trademark Stamp Printers Line™.

6) Lastly, a printability coating 26 (previously mentioned) similar to coating 16 is applied to the underside of liner 24. The release liner 24 may be printed with suitable graphics (not shown) such as order forms, use instructions, coupons and the like.

In traditional stamp production, the laminate 40 is then passed to a printing press where the stamp graphics are printed on the upper surface of the laminate. For the present invention, the laminate is die cut and optionally sheeted prior to printing. After die cutting, the laminate is then printed by various methods, preferably lithography, intaglio and/or gravure. Either before or after printing, the border of each stamp is perforated using the method described below.

Figure 4:
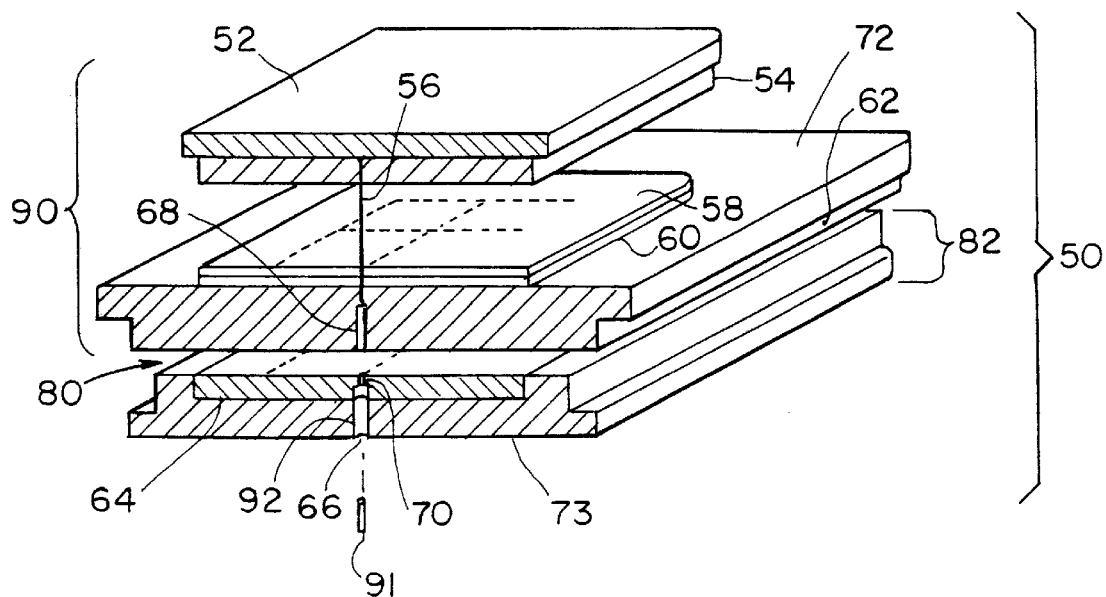
FIG. 4 is an exploded perspective view of a preferred perforator for perforating the stamp sheets of the invention.

The perforation method of the invention will now be described in greater detail with reference to FIGS. 4–5 herein.

First, the stamp laminate 40 (not shown) is fed into the opening 80 between a stationary lower cutting plate assembly 82 and an upper pin assembly 90 of a perforator 50 of the type made by WISTA GmbH of Germany, Model BPA 9070. The assembly 90 consists of a stationary guide member 72 with an intermediate plate 62 affixed thereto, one or more perforated felt sheets 58 and 60, and a reciprocating needle holder 54 and cover plate 52 to which is affixed a plurality of perforating pins 56 disposed perpendicular to the feed-stock laminate (not shown).

Lower assembly 82 consists of stationary guide member 73 and a cutting insert 64. Upper guide bores 68 are provided in plate 72 aligned with cutting bores 70 in guide number 73.

Figure 5:
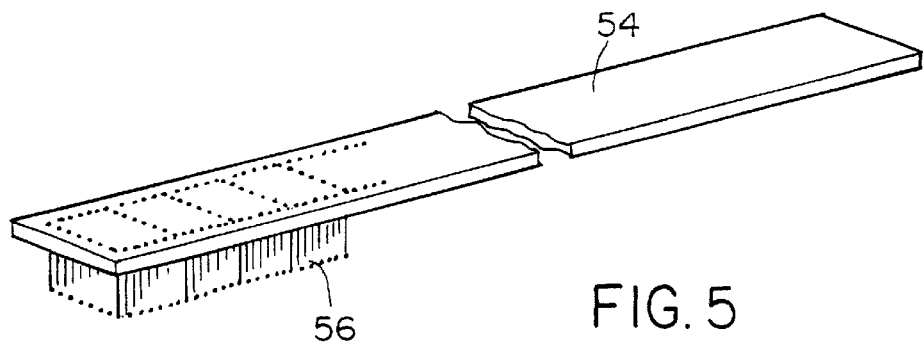
FIG. 5 is a perspective view of the pin or needle holder 54 of FIG. 4.

As shown in FIG. 5, the pins may be arranged in an array corresponding to the intended periphery of the stamps. Note however, that usually only three sides of the stamps are perforated per cycle in a U-shaped configuration. The laminate is then stepped a predetermined distance, and the bottom of the "U" becomes the top of the prior "U". In operation the holder 54 and cover plate 52 with the pins 56 attached thereto are reciprocated through the laminate (not shown) which is in opening 80 on the surface of cutting insert 64. The laminate is cleanly perforated, producing laminate cores 91 which are pushed through the openings 66 in wider diameter bore 92 provided in guide member 73. In order to provide a clean perforation through the laminate without tearing of the edges at the perforation, it is important to adjust the extent of the reciprocal pin motion with respect to the thickness of the sheets of laminate (which may preferably comprise anywhere from one to five or more sheets, again depending upon the laminate thickness). Also, the adhesive 22 must have appropriate mechanical properties which will minimize stringing and adherence of laminate layers to the pins or bores. To this end the adhesive 22 must also have a certain hardness range to retain integrity of the laminate 40 during and after the punching process. The addition of a control release agent (CRA) in coating 25a which reacts with the polysilaxane gives the necessary release properties.

We have experimented with various sheet thicknesses and have found that an overall laminate thickness of at least 0.009 inches can be perforated satisfactorily (which may require perforating more than one sheet at a time) using a penetration depth of 0.236 inches beneath the surface of cutting insert 64. Attempts to perforate thinner sheets of stock result in the so-called "toilet lid" phenomenon wherein portions of the perforated core 91 become hinged to the laminate at the periphery of the perforation and do not remain in bore 92. Likewise, it has been found that overall thickness of greater than 0.028 inches can become too great for satisfactory perforation, resulting in a failure to perforate altogether, damage to pins, and/or tearing of the laminate. In any case, the maximum overall thickness is limited to the width of the opening 80 which is 0.137 inches. The face paper 18 preferably has a tensile strength of 6±0.5 pounds per inch and 4±0.5 pounds per inch in the transverse direction, which provides the requisite cohesivity properties.

Some of the laminates 40 tested produced a gum-like build-up on the cutting plate 72, bore 92 and guide bore 68, creating an undesirable effect. This may be attributable to the particular composition of the laminate and especially the type of self-adhesive 22 used. It is preferable that a pressure-sensitive adhesive which resists edge ooze be used. Such an adhesive is less likely to cause build-up of the core material. Such adhesives are of the elastomeric or acrylic type formed by solvent, emulsion or bulk polymerization, and are cast onto the laminate base by solvent coating, emulsion coating or hot melt coating.

Preferably the adhesive 22 has release characteristics of at least about 50 grams per square inch, and more preferably in a broad range of 50 to about 200 grams per square inch, or in a more narrow range of about 100 to 150 rams per square inch.

Having thus described a few particular embodiments of the invention, various alterations, modifications and improvements will readily occur to those skilled in the art. For example, perforations could be made by laser beams or an abrasion and bump system. In the latter case the paper is passed between the nip of rollers, one of which is abrasive and the other of which has a bump, where the perforations are made. Also, while the system has been described mainly in connection with perforated postal stamps, any type of perforated PSA stamp may benefit from the invention. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto. In that respect, certain terms used in the claims are intended to have the following meanings:

1. "Clean" perforations or holes are perforations or holes having no appreciable hinged portions of the laminate remaining attached to the perforation/holes after perforation.

2. "Ooze" resistant adhesive is an adhesive which is sufficiently hard that during perforation the adhesive does not substantially adhere to the perforation pins.

What is claimed is:

1. The method of forming a perforated stamp product comprising the steps of:
    a) printing arrays of stamp graphics on a laminate comprising an outer sheet of self-adhesive paper material and a base release liner;
    b) perforating the periphery of the stamp graphics through the laminate; and
    c) cutting the release liner at least opposite each stamp graphic and not through the perforations.

2. The method of claim 1 wherein the perforations are made by a die tool having a pin and a female cutting member with a longitudinal opening therein and wherein the pin and cutting member reciprocate with respect to the sheets to cut holes in the stamp about the periphery thereof leaving the perforations made by the holes to collect in the cutting tool opening or pass therethrough.

3. The method of claim 2 wherein the self-adhesive in the paper is ooze-resistant and not activated by the perforation process.

4. The method of claim 1 wherein a plurality of such sheets are perforated at one time.

5. The method of claim 1 wherein the laminate thickness is at least 0.009 inches.

6. The method of claim 1 wherein the release liner is cut before the stamp graphics are imprinted.

7. The method of forming a perforated stamp product comprising the steps of:
    a) printing arrays of stamp graphics on a laminate comprising an outer sheet of paper material and a base release liner with an intermediate pressure-sensitive adhesive;
    b) perforating the border of the stamp graphics with a series of spaced holes through the laminate leaving no perforate material in the holes; and
    c) cutting the release liner at least opposite each stamp graphic and not through the perforation.

8. The method of claim 7 wherein the perforations are made by a die tool having a pin and a female cutting member with a longitudinal opening therein and wherein the pin and cutting member reciprocate with respect to the sheets to cut clean holes in the stamp product about the periphery thereof leaving the perforations made by the holes to collect in the cutting tool opening or pass therethrough.

9. The method of claim 8 wherein the self-adhesive in the paper is ooze-resistant and the adhesive is not activated by the perforation process.

10. The method of claim 7 wherein a plurality of such laminates are perforated at one time.

11. The method of claim 7 wherein the laminate thickness is at least 0.009 inches.

12. The method of claim 7 wherein the release liner is cut before the stamp graphics are imprinted.

* * * * *